(12) United States Patent
Goldstone et al.

(10) Patent No.: US 6,781,826 B1
(45) Date of Patent: Aug. 24, 2004

(54) EXTERNAL DISK DRIVE COMPATIBLE WITH A SERIAL ADVANCED TECHNOLOGY ATTACHMENT (SATA) STANDARD INCLUDING A SATA COMPATIBLE SHIELDED CABLE CAPABLE OF RECEIVING POWER SIGNALS FROM A HOST

(75) Inventors: Marc B. Goldstone, Irvine, CA (US); Dalwinder Singh, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/329,160

(22) Filed: Dec. 24, 2002

(51) Int. Cl.[7] .................................................. H05K 7/02
(52) U.S. Cl. ........................ 361/685; 361/687; 360/75; 711/112; 364/708.1
(58) Field of Search ................................ 361/685–687, 361/679–684, 724–727; 360/46, 68, 75, 25; 711/112; 364/708.1; 451/8, 28, 41, 317–318; 369/291

(56) References Cited

U.S. PATENT DOCUMENTS

| 5,243,495 A | * | 9/1993 | Read et al. ................... 361/685 |
| 5,307,229 A | * | 4/1994 | Sata ............................. 360/133 |
| 6,525,892 B1 | * | 2/2003 | Dunbar et al. ................. 360/31 |

* cited by examiner

*Primary Examiner*—Hung Van Duong
(74) *Attorney, Agent, or Firm*—Won Tae C. Kim, Esq.; Milad G. Shara, Esq.; Blakely, Sokoloff, Taylor & Zafman (57) ABSTRACT

Disclosed is an external disk drive compatible with a SATA standard for attachment to a host having a conductive enclosure. The external SATA compatible disk drive includes a SATA device connector and an enclosure surrounding the external SATA compatible disk drive. The external SATA compatible disk drive further includes a SATA compatible cable having a disk drive end that is coupled to the SATA device connector of the disk drive and a host end for coupling to the host, wherein the SATA compatible cable is capable of delivering power signals to the external SATA compatible disk drive from the host. Also, the external SATA compatible disk drive includes a shield surrounding the SATA compatible cable that is coupled to the enclosure of the disk drive.

33 Claims, 9 Drawing Sheets

EXTERNAL DISK DRIVE COMPATIBLE WITH A SERIAL ADVANCED TECHNOLOGY ATTACHMENT (SATA) STANDARD INCLUDING A SATA COMPATIBLE SHIELDED CABLE CAPABLE OF RECEIVING POWER SIGNALS FROM A HOST

BACKGROUND OF THE INVENTION

1. Field of the Invention

The present invention relates to disk drives. More particularly, the present invention relates to an external disk drive compatible with a Serial Advanced Technology Attachment (SATA) standard including a SATA compatible shielded cable capable of receiving power signals from a host.

2. Description of the Prior Art and Related Information

Today, computers are routinely used both at work and in the home. Computers advantageously enable file sharing, the creation of electronic documents, the use of application specific software, and electronic commerce through the Internet and other computer networks. Typically, each host computer has a storage peripheral. For example, the most common type of storage peripheral is a rotating media storage device (RMSD), such as a disk drive (e.g. hard disk, 3.5 inch disk, CD ROM, ZIP, etc.). Further, it is becoming increasingly common to utilize external disk drives that are easily removable from a host computer such that data can be readily transferred from one host computer to another. For example, it is useful for people to have an external disk drive, which they can use at work to store work related projects, easily remove and take home with them, and then plug into their home computer such that they can work on their projects at home. However, it should be appreciated that external disk drives may either be fixed or removable.

Disk drives are typically connected to a host computer through a host interface connector for the transfer of commands, status and data. The host computer accesses the disk drive and reads data from the disk drive and/or saves data to the disk drive. The disk drive is typically connected to the host computer via a cable and a cable connector that connects to a device connector of the disk drive. For compatibility, the connectors and interface protocol are standardized. Accordingly, the cable, cable connector, and device connector should comply with the same interface standard. There are several disk drive interface standards, e.g., Advanced Technology Attachment (ATA) and Small Computer System Interface (SCSI) that have become common in the last decade.

However, disk drives are now being designed to comply with a newer standard, generally referred to as the Serial Advanced Technology Attachment (SATA) standard, which is the standard presently favored for newer computers. The SATA standard is being promulgated by the Serial ATA Working Group and is specifically referred to as the Serial ATA: High Speed Serialized AT Attachment specification or Serial ATA standard 1.0. The SATA specification defines various general standards for SATA compatible cable connectors, SATA compatible cables, and SATA compatible device connectors.

The SATA device connector defined in the SATA specification basically specifies a male robust type connector having an insulated housing, a first blade connector for supporting an electrical contact arrangement configured for data signals, a second blade connector for supporting an electrical contact arrangement configured for power signals, and two board locks fixed to the housing for attaching the device connector to a PCB. Further, the SATA device connector defined in the SATA specification sets forth that the housing includes a pair of opposed guide slots in each one of two opposite side walls of the housing that define a cable connector receiving area. The pair of opposed guide slots aid in guiding cable and back-plane connectors to mate with a blade connector. The SATA specification similarly describes a SATA cable connector that is a female robust type connector configured to mate with male robust SATA device connector.

Currently, external disk drives (e.g. ATA compatible disk drives), typically have built-in power supplies. There is considerable material cost for the power supply. However, in the case where the external disk drive is used with a host computer, the dedicated power supply is redundant—because the host computer most likely already has sufficient capability to provide the necessary power to the external disk drive. In addition, external powered disk drives require an additional alternating current (AC) power connection. In cases where the external disk drive is powered from a different source (i.e. another brand circuit) of power than the host computer, a ground loop may be set up, which could negatively impact the disk drive error rate or even signal integrity on the host interface.

SUMMARY OF THE INVENTION

The present invention relates to an external disk drive compatible with a Serial Advanced Technology Attachment (SATA) standard including a SATA compatible shielded cable capable of receiving power signals from a host.

In one aspect, the invention may be regarded as an external disk drive compatible with a SATA standard for attachment to a host having a conductive enclosure that includes a conductive back-panel. The external SATA compatible disk drive includes a disk for rotation within the disk drive, a moveable head for writing and reading data to and from the disk, a disk controller system for controlling operations of the disk drive, a printed circuit board (PCB) for mounting the disk controller system, a SATA device connector coupled to the PCB, and an enclosure surrounding the external SATA compatible disk drive. The external SATA compatible disk drive further includes a SATA compatible cable having a disk drive end that is coupled to the SATA device connector of the disk drive and a host end for of coupling to the host, wherein the SATA compatible cable is capable of delivering power signals to the external SATA compatible disk drive from the host. Also, the external SATA compatible disk drive includes a shield surrounding the SATA compatible cable. The shield is coupled to the enclosure of the disk drive.

In one embodiment, the enclosure surrounding the external SATA compatible disk drive is made from a conductive material. Further, the shield surrounding the SATA compatible cable is made from a conductive material. Particularly, the conductive shield surrounding the SATA compatible cable contacts and is electrically coupled to the conductive enclosure of the disk drive thereby forming a continuous electro-magnetic interference (EMI) shield about the external SATA compatible disk drive and the cable.

In a more detailed embodiment, the disk drive end of the SATA compatible cable may include a SATA cable connector to mate with a SATA device connector of the disk drive. The host end of the SATA compatible cable may also include a SATA cable connector. Further, the host may include a SATA host connector attachable to a slot of the conductive back-panel of the host. The SATA cable connector of the SATA compatible cable at the host end is capable of mating with the SATA host connector of the host such that SATA data signals and power signals are deliverable from the host to the external SATA compatible disk drive through the SATA compatible cable. The power signals from the host may be current limited.

In an even more detailed embodiment, when the SATA cable connector of the SATA compatible cable at the host end mates with the SATA host connector of the host, the conductive shield surrounding the SATA compatible cable is electrically coupled to the conductive back-panel of the conductive enclosure of the host. In this way, the SATA compatible cable is electrically coupled to both the conductive enclosure of the disk drive and the conductive enclosure of the host such that electromagnetic shielding is provided. Further, in another embodiment, the SATA host connector is attachable to the slot of the conductive back-panel of the conductive enclosure of the host by a conductive attachment shroud such that when the SATA cable connector of the SATA compatible cable at the host end mates with the SATA host connector of the host, the conductive shield surrounding the SATA compatible cable is electrically coupled to the attachment shroud. In this way, the SATA compatible cable is electrically coupled to both the conductive enclosure of the disk drive and the conductive enclosure of the host such that electromagnetic shielding is provided.

In a further detailed embodiment, the host may include a moveable cover to cover the SATA host connector. Also, as an example, in one embodiment, the SATA compatible cable may be compatible for use with a UL 1950/EN 60950 standard. Moreover, the SATA cable connector at the host end and the SATA cable connector at the disk drive end of the SATA compatible cable may also both the compatible for use with a UL 1950/EN 60950 standard.

In another aspect, the invention may be regarded as a system for connecting an external disk drive compatible with a SATA standard to a host, in which the host has a conductive enclosure including a conductive back-panel. The system includes an external SATA compatible disk drive having a SATA device connector, an enclosure surrounding the external SATA compatible disk drive, a SATA compatible cable having a disk drive end including a SATA cable connector that is coupled to the SATA device connector of the disk drive and a host end having a SATA cable connector that may be coupled to the host. Further, a shield surrounds the SATA compatible cable. The shield is coupled to the enclosure of the external SATA compatible disk drive. Additionally, a SATA host connector is attachable to a slot of the conductive back-panel of the host. The SATA cable connector of the SATA compatible cable at the host end may mate with the SATA host connector of the host such that SATA data signals and power signals may be delivered from the host to the external SATA compatible disk drive through the SATA compatible cable. In one embodiment, the power signals from the host may be current limited.

In one embodiment, the enclosure surrounding the external SATA compatible disk drive is made from a conductive material. Further, the shield surrounding the SATA compatible cable is made from a conductive material. Particularly, the conductive shield surrounding the SATA compatible cable contacts and is electrically coupled to the conductive enclosure of the disk drive thereby forming a continuous electro-magnetic interference (EMI) shield about the external SATA compatible disk drive and the cable.

In a more detailed embodiment, when the SATA cable connector of the SATA compatible cable at the host end mates with the SATA host connector of the host, the conductive shield surrounding the SATA compatible cable is electrically coupled to the conductive back-panel of the conductive enclosure of the host. In this way, the SATA compatible cable is electrically coupled to both the conductive enclosure of the disk drive and the conductive enclosure of the host such that electromagnetic shielding is provided. Further, in another embodiment, the SATA host connector is attachable to the slot of the conductive back-panel of the conductive enclosure of the host by a conductive attachment shroud such that when the SATA cable connector of the SATA compatible cable at the host end mates with the SATA host connector of the host, the conductive shield surrounding the SATA compatible cable is electrically coupled to the attachment shroud. In this way, the SATA compatible cable is electrically coupled to both the conductive enclosure of the disk drive and the conductive enclosure of the host such that electromagnetic shielding is provided.

In a further detailed embodiment, the host may include a moveable cover to cover the SATA host connector. Also, as an example, in one embodiment, the SATA compatible cable may be compatible for use with a UL 1950/EN 60950 standard. Moreover, the SATA cable connector at the host end and the SATA cable connector at the disk drive end of the SATA compatible cable may also both the compatible for use with a UL 1950/EN 60950 standard.

The foregoing and other features of the invention are described in detail below and set forth in the appended claims.

DETAILED DESCRIPTION

Figure 1:
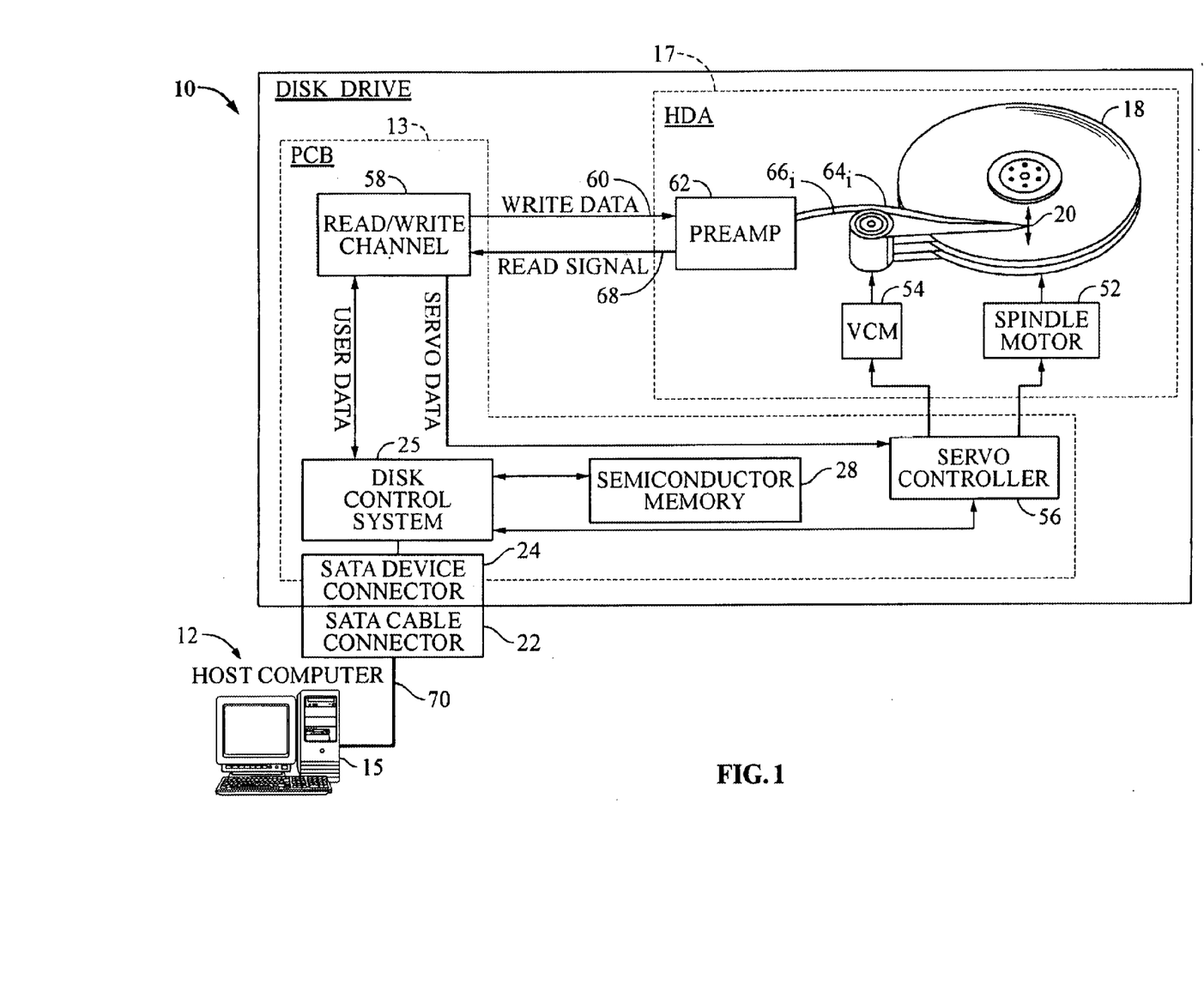
FIG. 1 shows a block diagram of a system including a host computer connected to an external SATA compatible disk drive, in which embodiments of the invention may be practiced.

With reference to FIG. 1, FIG. 1 shows a block diagram of a system including a host computer 12 connected to an external SATA compatible disk drive 10. In this embodiment, the external SATA compatible disk drive 10 acts as the storage peripheral. It should be appreciated that the external SATA compatible disk drive 10 may be any type of disk drive, e.g., hard disk, 3.5 inch disk, CD ROM, ZIP, etc.; but will be described as an exemplary external SATA compatible hard disk drive with reference to FIG. 1.

The external SATA compatible disk drive 10 includes a head disk assembly (HDA) 17 having a disk 18 and a transducer head 20 actuated radially over the disk. The external SATA compatible disk drive 10 further includes a disk control system 25, which may include a SATA interface (not shown), and a serial ATA (SATA) device connector 24. The disk control system 25 responds to disk-drive commands and accesses data storage locations on the disk 18 through the transducer head 20. The SATA device connector 24 couples the disk control system 25 to the host computer 12 when the external SATA compatible disk drive 10 is connected to the host computer 12 via a SATA compatible cable 70 and the SATA cable connector 22.

The HDA 17 of the external SATA compatible disk drive 10 further includes a spindle motor 52 for rotating the disk 18 and a voice coil motor (VCM) 54 for actuating the transducer head 20 radially over the disk 18. A servo controller 56 generates the appropriate control signals applied to the spindle motor 52 and the VCM 54 in response to commands received from the disk control system 25. During a write operation the disk control system 25 transmits user data received from the host computer 12 to a read/write channel 58. The read/write channel 58 performs appropriate encoding of the user data to generate write data 60 written to the disk 18. The write data 60 modulates the operation of a preamp 62 to generate a write signal $64_i$ applied to the head 20 in order to write magnetic transitions onto the surface of the disk 18. During a read operation, the head 20 detects the magnetic transitions representing the recorded data to generate a read signal $66_i$ which is amplified by the preamp 62 to generate a read signal 68 applied to the read/write channel 58. The read/write channel 58 demodulates the read signal 68 into user data transmitted to the host computer 12 via disk control system 25 after correcting errors.

The external SATA compatible disk drive 10 communicates with the host computer 12 over the SATA compatible cable 70 that includes a SATA cable connector 22 connected to the SATA device connector 24 using a communication protocol defined by an industry standard such as the Serial ATA standard 1.0. In another embodiment, the disk drive may communicate with the host computer using an industry standard known as Serial Attached SCSI (SAS), which contemplates using cabling and circuitry originally defined in the SATA standard.

The disk 18, spindle motor 52, VCM 54, preamp 62, and related hardware may be integrated into the HDA 17. The disk control system 25, SATA device connector 24, semiconductor memory 28, servo controller 56, read/write channel 58, and related electronics may be mounted on a printed circuit board (PCB) 13. The disk control system 25 generally includes circuitry and processors that control the HDA 17 and that provide an intelligent control interface between the host computer 12 and the HDA for execution of disk-drive commands. The disk control system 25 may have an internal microprocessor and nonvolatile memory for implementing some of the techniques of the invention. The semiconductor memory 28 may have nonvolatile memory and volatile random access memory (RAM).

Figure 2:
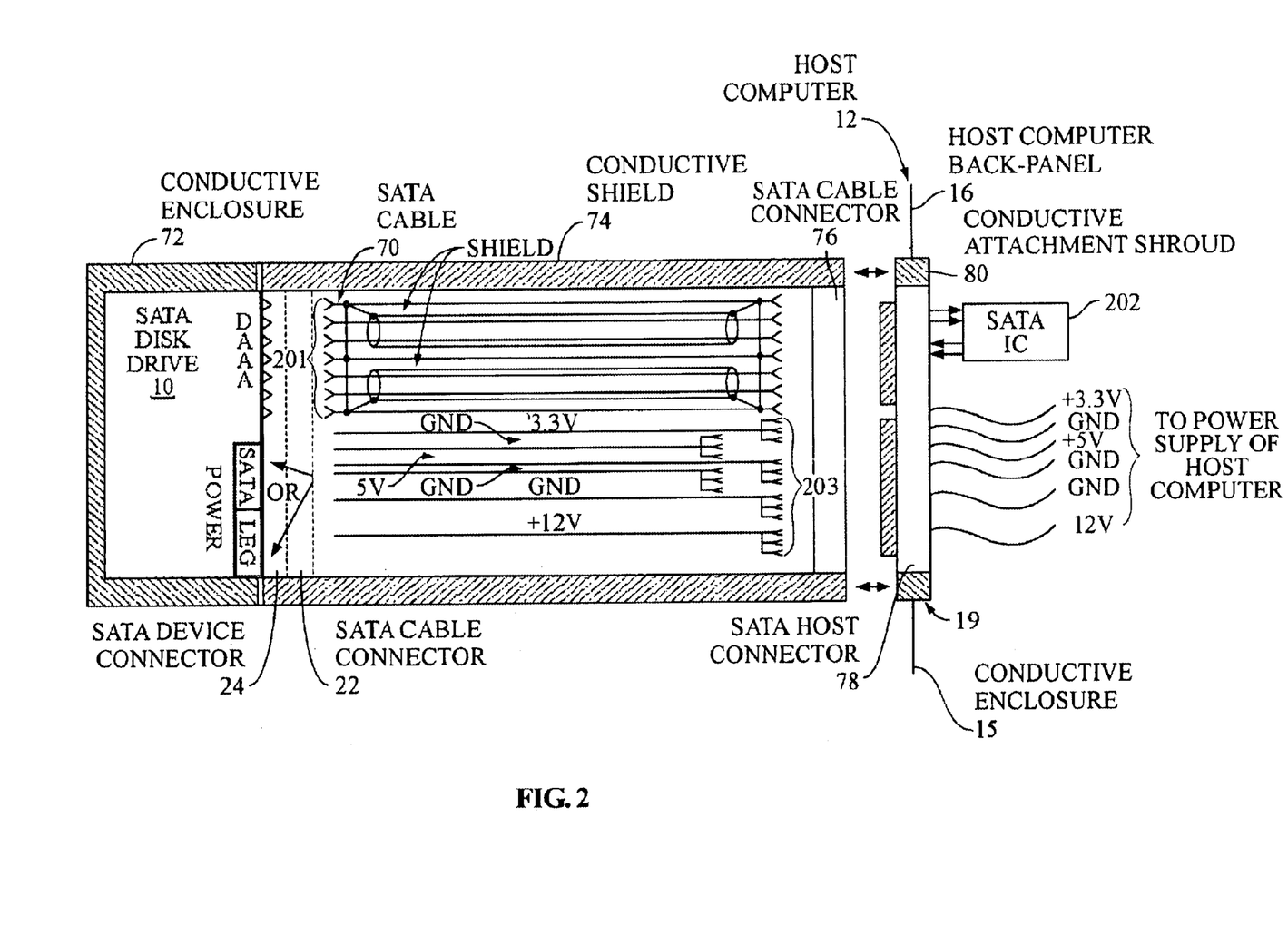
FIG. 2 is a schematic diagram illustrating an external SATA compatible disk drive that is connectable to a host computer via a shielded SATA compatible cable, according to one embodiment of the invention.

FIG. 2 is a schematic diagram illustrating an external SATA compatible disk drive 10 that is connectable to a host computer 12 via a shielded SATA compatible cable 70, according to one embodiment of the invention. The external SATA compatible disk drive 10 is connectable to the host computer by a SATA device connector 24 and a SATA compatible cable 70. In one embodiment, the external SATA compatible disk drive 10 may be integrally formed with the SATA compatible cable 70. However, in other embodiments, the external SATA compatible disk drive 10 and the SATA compatible cable 70 may be separable. In either case, the external SATA compatible disk drive 10 and the SATA compatible cable 70 are connectable to one another by the coupling of the SATA device connector 24 of the external SATA compatible disk drive 10 to a SATA cable connector 22 of the SATA compatible cable 70. Further, it should be appreciated that the term SATA compatible implies that the disk drive, cable, and other components described herein are configurable to work with SATA based standards, but may also be configurable to work with other standards in addition to or instead of the SATA based standard.

A conductive enclosure 72 surrounds the external SATA compatible disk drive 10. The conductive enclosure 72 that surrounds the external SATA compatible disk drive 10 is made from a conductive material such as a metal or a metallized plastic. Intenal to the external SATA compatible disk drive 10, the casting of the HDA may be supported within the conductive enclosure 72 so as to minimize shock and vibration while providing electrical isolation between the components of the external SATA compatible disk drive 10 and its conductive enclosure 72. The electrical isolation is used to prevent inducing circulating currents through the conductive shield 74 of the shielded SATA compatible cable 70. These circulating currents would cause problematic electromagnetic interference (EMI) if present.

The SATA compatible cable 70 has a disk drive end that includes a SATA cable connector 22 that is coupled to the SATA device connector 24 of the external SATA compatible disk drive 10 and a host end having a SATA cable connector 76 that may be coupled to a SATA host connector 78 of the host computer 12. In this way, utilizing the SATA compatible cable 70, the external SATA compatible disk drive 10 may be coupled to the host computer 12. In one embodiment, the SATA device connector 24 of the external SATA compatible disk drive 10 and the SATA host connector 78 of the host computer 12 may be male SATA connectors and the SATA cable connectors 22 and 76 of the SATA compatible cable 70 may be female SATA connectors. However, it should be appreciated that this configuration may be reversed such that male SATA connectors are used in place of female SATA connectors and vice-versa. Further, examples of both male and female SATA connectors will be discussed in more detail later.

A conductive shield 74 surrounds the SATA compatible cable 70. The conductive shield 74 that surrounds the SATA compatible cable 70 may be made from a conductive material such as a metal or a metallized plastic. The conductive shield 74 of the SATA compatible cable 70 is coupled to the conductive enclosure 72 of the external SATA compatible disk drive 10. It should be appreciated that the conductive shield 74 of the SATA compatible cable 70 is coupled to the conductive enclosure 72 of the external SATA compatible disk drive 10 whether the external SATA compatible disk drive 10 and the SATA compatible cable 70 are integrally formed, or whether the SATA compatible cable is separately attached to the external SATA compatible disk drive 10. Particularly, the conductive shield 74 surrounding the SATA compatible cable 70 contacts and is electrically coupled to the conductive enclosure 72 of the external SATA compatible disk drive 10 thereby forming a continuous electromagnetic interference (EMI) shield about the external SATA compatible disk drive 10 and the SATA compatible cable 70.

Additionally, a SATA host connector 78 is attachable to a slot 19 of the conductive back-panel 16 of the conductive enclosure 15 of the host computer 12. A SATA cable connector 76 of the shielded SATA compatible cable 70 at the host end may be mated with the SATA host connector 78 of the host computer 12 such that SATA data signals and power signals may be delivered from the host computer 12 to the external SATA compatible disk drive 10 through the shielded SATA compatible cable 70. The power signals from the host computer 12 are inherently current limited (e.g. to 7 Amps maximum) by the power supply of the host computer to meet regulatory and safety concerns.

When the SATA cable connector 76 of the shielded SATA compatible cable 70 at the host end mates with the SATA host connector 78 of the host computer 12, the conductive shield 74 surrounding the SATA compatible cable 70 is electrically coupled to the conductive back-panel 16 of the conductive enclosure 15 of the host computer 12. In this way, the shielded SATA compatible cable 70 is electrically coupled to both the conductive enclosure 72 of the external SATA compatible disk drive 10 and the conductive enclosure 15 of the host computer 12 such that sufficient electromagnetic shielding is provided for both the external SATA compatible disk drive 10 and the shielded SATA compatible cable 70.

Further, in one embodiment, the SATA host connector 78 is attachable to a slot 19 of the conductive back-panel 16 of the conductive enclosure 15 of the host computer 15 by a conductive attachment shroud 80 such that when the SATA cable connector 76 of the shielded SATA compatible cable 70 at the host end mates with the SATA host connector 78 of the host computer 12, the conductive shield 74 surrounding the SATA compatible cable 70 is electrically coupled to the attachment shroud 80. In this way, the shielded SATA compatible cable 70 is electrically coupled to both the conductive enclosure 72 of the external SATA compatible disk drive 10 and the conductive enclosure 15 of the host computer such that sufficient electromagnetic shielding is provided for both the external SATA compatible disk drive 10 and the shielded SATA compatible cable 70.

Looking particularly at the schematic diagram of FIG. 2, the shielded SATA compatible cable 70 includes a plurality of SATA data signal conductors 201 to route SATA data signals from a SATA interface IC 202 of the host computer 12 to the external SATA compatible disk drive 10. The SATA data signal conductors 201 may be internally shielded together in various configurations, one of which is shown in FIG. 2. Further, as shown in the schematic diagram of FIG. 2, the shielded SATA compatible cable 70 includes a plurality of SATA power signal conductors 203 to route SATA power signals and grounds from the power supply of the host computer 12 to the external SATA compatible disk drive 10. The power signals may include any combination of 12V, 5V, and 3.3V power signals, which can be routed to both SATA power connections and legacy power connections of the device connector 24, for use by the external SATA compatible disk drive 10.

All of the SATA data signal and power signal conductors 201 and 203 of the SATA compatible cable 70 are surrounded by the conductive shield 74. As previously discussed, the conductive shield 74 is electrically terminated at the host end to the back-panel 16 and conductive enclosure 15 of the host computer 12. All of the SATA data signal and power signal conductors 201 and 203 are covered by the conductive shield 74 from the point where they emerge form the conductive enclosure 72 of the external SATA compatible disk drive 10 to where they terminate with the SATA host connector 78 of the host computer 12. The conductive shield 74 of the SATA compatible cable 70 is electrically isolated from all of the internal SATA data signal and power signal conductors 201 and 203 within the SATA compatible cable 70 to ensure that there are not current loops through the conductive shield 74, as they would cause EMI. At the host end, the conductive shield 74 of the SATA compatible cable 70 electrically terminates to the back-panel 16 of the host computer 12 and therefore the entire conductive enclosure 15 of the host computer 12 provides a large continuous area of the host computer 12 for electromagnetic shielding and grounding. Thus, the shielded SATA compatible cable 70 and the conductive enclosure 72 of the external SATA compatible disk drive 10 when connected to the host computer 12 form a continuous shield over the whole system providing for very low EMI.

Also, as an example, the SATA compatible cable 70 may be designed to be compatible for use with the UL 1950/EN 60950 standard to comply with standardized requirements for cable insulation and flame rating. Likewise, the SATA cable connector 76 at the host end and the SATA cable connector 22 at the disk drive end of the SATA compatible cable 70 may also both be compatible for use with the UL 1950/EN 60950 standard. Further, as will be discussed in more detail later, the host computer 12 may include a moveable cover to cover the SATA host connector 78.

Although not pertinent to the invention, voltage drop across the SATA compatible cable 70 may be dealt with in several ways, as should be apparent to those skilled in the art. For instance, as one example, conductors with a low wire gauge (i.e. thick conductors with low resistance) may be utilized with the SATA compatible cable 70. Alternatively, several paralleled higher gauge wires can be used. Further, various other means may optionally be employed within the external SATA compatible disk drive 10 itself to address voltage drop, such as to selectively limit spindle start current. Another option is to limit seek performance to lower operational current requirements. For example, the external SATA compatible disk drive 10 may invoke one or more of currently known lower power modes often utilized by disk drives. As another example, voltages may be locally regulated within the external SATA compatible disk drive 10. As yet another example, highly limited voltages/currents (e.g. +/−5%) may be provided by the host power supply to overcome voltage drops across the cable.

Figure 3A:
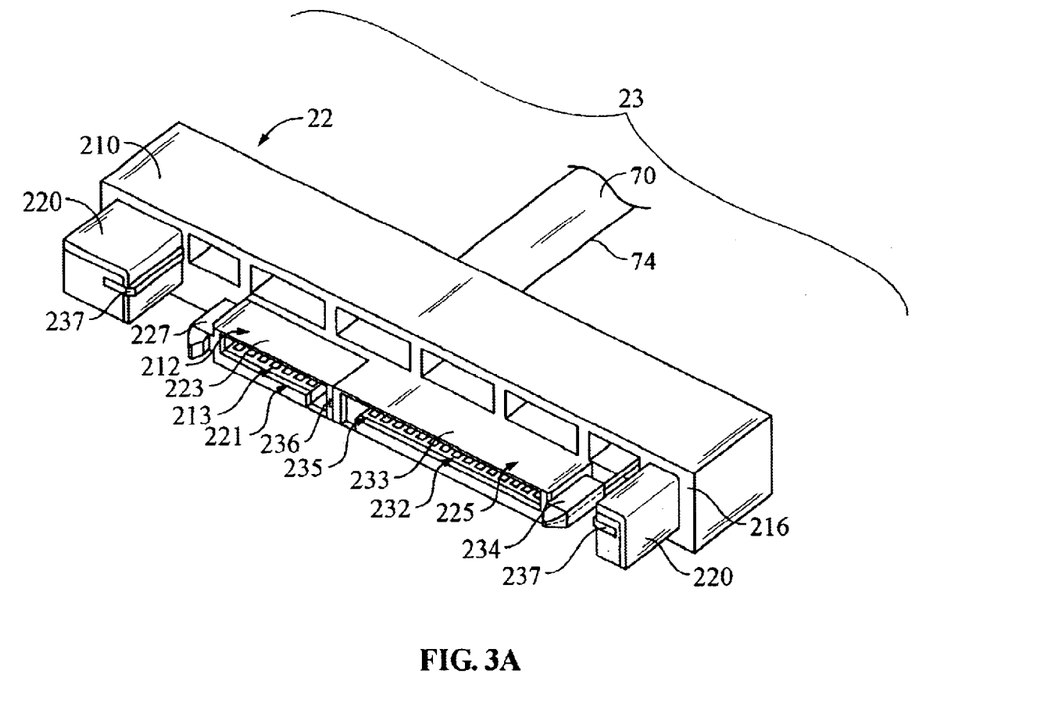
FIG. 3A shows a perspective view of a female robust SATA cable connector, according to one embodiment of the invention.
Figure 3B:
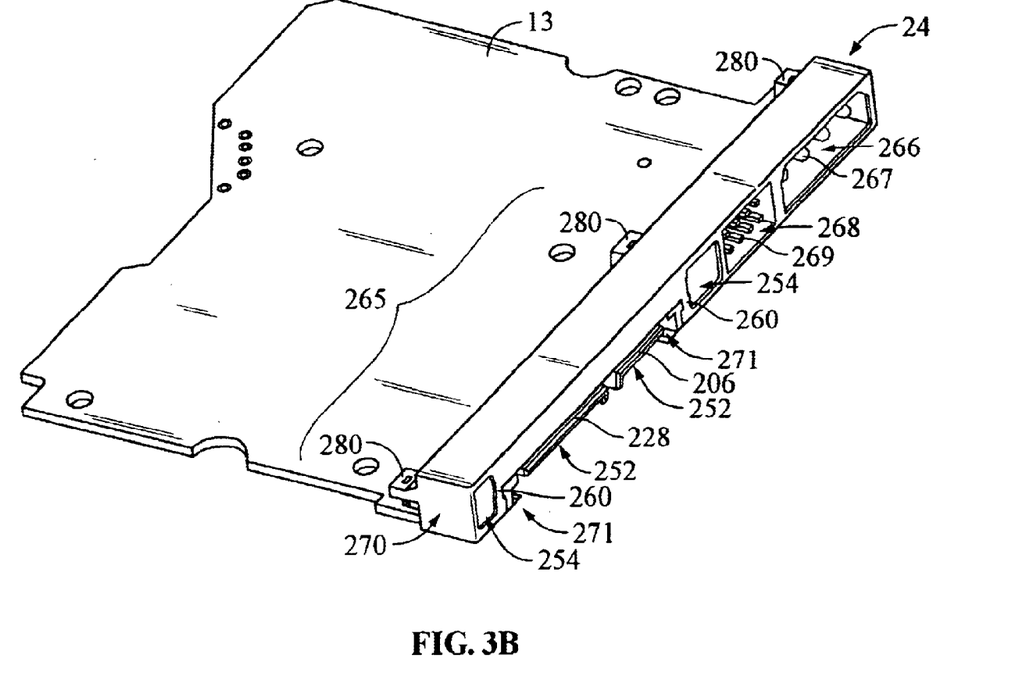
FIG. 3B shows a perspective view of a male robust SATA device or host connector, according to one embodiment of the invention.

With reference now to FIGS. 3A and 3B, an example of a female robust SATA cable connector 22 for use as the SATA cable connectors 22 and 76, respectively, of the SATA compatible cable 70 (FIG. 3A), according to one embodiment of the invention, and a male robust SATA connector 24 for use as the SATA device connector 24 of the external SATA compatible disk drive 10 and the SATA host connector 78 of the host computer 12 (FIG. 3B), according to one embodiment of the invention, are shown.

FIG. 3A shows a perspective view of the female robust SATA cable connector 22 having a first blade-receiving portion 212 that includes a first data electrical contact arrangement 213 configured in accordance with a SATA standard. The first data electrical contact arrangement 213 of the first blade-receiving portion 212 is configured to mate with a first blade connector 206 of the male robust SATA connector 24 having a second electrical contact arrangement (not shown) also in accordance with the SATA standard.

Particularly, in one embodiment, the female robust SATA connector 22 includes a first blade-receiving portion 212 for enclosing the first electrical contact arrangement 213, a housing 210 for supporting the first blade-receiving portion 212, a second blade-receiving portion 225 (as will be discussed), and a pair of laterally-opposed guide arms 220 that are integrally formed with the housing. Further, the housing 210 has a cable entrance end 214 and a mating end 216. The pair of laterally-opposed guide arms 220 project from the mating end 216 of the housing 210 and are disposed outside of and are separate from the first blade-receiving portion 212 and the second blade-receiving portion 225.

In one embodiment, the first electrical contact arrangement 213 of the first blade-receiving portion 212 is configured for data signals in accordance with the SATA standard and is particularly configured to mate with the first blade connector 206 of the PCB connector 24 having a second electrical contact arrangement (not shown) also configured for data signals in accordance with the SATA standard. Further, the shielded SATA compatible cable 70 has a plurality of conductors configured for data signals in accordance with the SATA standard that are coupled to the data blade-receiving portion 212. Particularly, the plurality of conductors of the shielded SATA compatible cable 70 are connected to the data electrical contact arrangement 213 of the data blade-receiving portion 212.

The data blade-receiving portion 212 includes a generally oblong rectangular housing 223 for enclosing the data electrical contact arrangement 213 configured in accordance with the SATA standard. At one end, the data blade-receiving portion 212 includes an L-shaped opening 224 for receipt of the corresponding L-shaped data blade connector 206 of the PCB connector 24 which has a mating data electrical contact arrangement configured in accordance with the SATA standard such that the data blade connector 206 properly mates with the data electrical contact arrangement 213 of the data blade-receiving portion 212. At the other end, the data blade-receiving portion 212 receives the shielded SATA compatible cable 70 having a plurality of conductors configured for data signals in accordance with the SATA standard and the plurality of conductors are connected to the data electrical contact arrangement 213 inside the housing 223 of the data blade-receiving portion 212.

Further, the data blade-receiving portion 212 includes a side guide rail 227 to mate with the male robust SATA connector 24, as will be discussed in detail later. The data blade-receiving portion 212 may be integrally molded with the housing 210.

Continuing with reference FIG. 3A, the second blade-receiving portion 225 will now be described. The second blade-receiving portion 225 supports a third electrical contact arrangement 232 to mate with a second blade connector 228 of the male robust SATA device connector 24 having a fourth electrical contact arrangement (not shown) in accordance with the SATA standard.

In one embodiment, the third electrical contact arrangement 232 is configured for power signals in accordance with the SATA standard and is configured to mate with the second blade connector 228 of the male robust SATA connector 24 having a fourth electrical contact arrangement (not shown) also configured for power signals in accordance with the SATA standard. Particularly, in this embodiment, the female robust SATA connector 22 includes a second blade-receiving portion 225 for enclosing the power electrical contact arrangement 232. Further, the shielded SATA compatible cable 70 includes a plurality of conductors configured for power signals in accordance with the SATA standard which are connected to the power electrical contact arrangement 232 of the power blade-receiving portion 225 inside the power blade-receiving portion. In this embodiment, the combination of the male robust SATA connector 22 including the data and power blade-receiving portions 212,225 and the shielded SATA compatible cable 70 connected thereto, may be referred to as cable assembly 23.

For example, in this embodiment, as shown in FIG. 3A, the first electrical contact arrangement 213 of the first blade-receiving portion 212 may be configured for data signals in accordance with the SATA standard to mate with the first blade connector 206 of the male robust SATA device connector 24 having a second electrical contact arrangement similarly configured for data signals in accordance with the SATA standard and the third electrical contact arrangement 232 of the second blade-receiving portion 225 may be configured for power signals in accordance with the SATA standard to mate with the second blade connector 228 of the male robust SATA device connector 24 having a fourth electrical contact arrangement similarly configured for power signals in accordance with the SATA standard. Accordingly, the data blade-receiving portion 212 mates with the data blade connector 206 of the male robust SATA device connector 24 and the power blade-receiving portion 225 mates with the power blade connector 228 of the male robust SATA device connector 24, respectively.

Looking particularly at the power blade-receiving portion 225, the power blade-receiving portion 225 includes a generally rectangular housing 233 for enclosing the power electrical contact arrangement 232 configured in accordance with the SATA standard. At one end, the power blade-receiving portion 225 includes an L-shaped opening 235 for receipt of the corresponding L-shaped power blade connector 228 of the male robust SATA device connector 24, which has a mating power electrical contact arrangement configured in accordance with the SATA standard, such that the power blade connector 228 of the male robust SATA device connector 24 properly mates with the power electrical contact arrangement 232 of the power blade-receiving portion 225. At the other end, the power blade-receiving portion 225 receives the shielded SATA compatible cable 70 having a plurality of conductors configured for power signals in accordance with the SATA standard and the plurality of conductors are connected to the power electrical contact arrangement 232 inside the housing 233 of the power blade-receiving portion 225.

Continuing with reference FIGS. 3A and 3B, the pair of laterally-opposed guide arms 220 will now be discussed. As previously described, the guide arms 220 project from the mating end 216 of the housing 210 of the cable connector 22.

In one embodiment each of the guide arms 220 may include a conductive contact 237 such as a grounding clip. The conductive contacts may provide pre-grounding functionality for one of the data or power blade-receiving portions or both. For example, one of the conductive contacts 237 of a one of the guide arms may be coupled to a ground conductor of the shielded SATA compatible cable 70 (e.g. configured for data signals) and the other conductive contact 237 of the other guide arm may be coupled to a ground conductor of the shielded SATA compatible cable 70 (e.g. configured for power signals).

Also, in one embodiment, the housing 210 and the guide arms 220 may be made from a conductive material (e.g. a metallic material or conductive plastic material) such that the female robust SATA connector 22 is conductive in conjunction with the shielded SATA compliant cable 70.

The male robust SATA connector 24 will now be described in detail. As shown in FIG. 3B, the male robust SATA connector 24 is typically mounted to a printed circuit board (PCB) 13. However, it may also be connected to many other types of differing wiring, connectors, circuit board configurations, etc. In the PCB embodiment, mounting brackets 280 of the male robust SATA connector 24 support the PCB 13 and mounting posts 281 extend from the mounting brackets 280 via through-holes of the PCB creating an interference fit to secure the male robust SATA connector 24 to the PCB 13. Further, as will be discussed many pins of the various connectors are also fixed to the PCB 13 further securing the male robust SATA connector 24 to the PCB 13.

In one embodiment, the male robust SATA connector 24 includes a housing 270 having a SATA section 265, a legacy Integrated Drive Electronics (IDE) power section receptacle 266, and a user section receptacle 268. In other embodiments of the male robust SATA connector 24, the housing 270 of male robust SATA connector 24 may only include the SATA section 265 and the legacy IDE power section receptacle 266 and the user section receptacle 268 may not be present. Particularly, looking at the SATA section 265, the male robust SATA connector 24 includes a first blade connector 206 for supporting a first electrical contact arrangement (not shown) in accordance with a SATA standard, a second blade connector 228 for supporting a second electrical contact arrangement (not shown) in accordance with the SATA standard, and the housing 270 encloses the first and second blade connectors and the supported electrical contact arrangements. As should be appreciated, the electrical contacts of the electrical contact arrangements of the blade connectors 206 and 228 are mounted to the PCB 13 via through-holes of the PCB 13, for example. Alternatively, other methods of mounting the electrical contacts could be used, such as surface mount technologies.

In one embodiment, the housing 270 includes a pair of opposed guide slots 271 in each one of two opposite sidewalls of the housing 270 that define a cable connector receiving area 252 around the first and second blade connectors 206 and 228 for the receipt of at least one cable connector, respectively. The cable connector receiving area 252 is in accordance with the SATA standard. In one embodiment, the first electrical contact arrangement (not shown) of the first L-shaped blade connector 206 is configured for data signals in accordance with the SATA standard and a second electrical contact arrangement (not shown) of the second L-shaped blade connector 228 is configured for power signals in accordance with the SATA standard.

However, above and beyond the cable connector receiving area 252 as defined in accordance with the SATA standard, the housing 270 of male robust SATA connector 24 includes two guide arm receiving cavities 254 that are integrally formed with the housing 270 and that are disposed outside of the cable connector receiving area 252. In one embodiment, the housing 270 includes a pair of laterally-opposed guide arm receiving cavities 254 that are integrally formed with the housing 270 and that are disposed outside the cable connector receiving area 252. The guide arm receiving cavities 254 are adapted for the receipt of the guide arms 220 from the mating female robust SATA connector 24. In one embodiment, the guide arm receiving cavities 254 are approximately rectangularly shaped and may be differently sized. The housing 270 further includes substantially thickened strengthening walls 260 disposed between the cable connector receiving area 252 and the guide arm receiving cavities 254 making the male robust SATA connector 24 very robust.

Accordingly, above and beyond presently manufactured cable connectors that mate to the SATA standards defined cable connector receiving area of presently manufactured male SATA connectors, embodiments for the more robust SATA compatible female connector 22 and the more robust SATA compatible male connector 24 avoid many of the breakage problems associated with these present devices.

More particularly, according to embodiments of the invention, the housing 210 of the female robust SATA compatible connector 22 rigidly contains the data blade-receiving portion 212 and the power blade-receiving portion 225. When the female robust SATA compatible connector 22 is mated to the male robust SATA compatible connector 24, the pair of laterally-opposed guide arms 220 of the female robust connector 22 mate with the pair of laterally-opposed guide arm cavities 254 of the male robust connector 24, along with the standard guide rails 224 and 234 to the standard guide slots 271, such that the blade-receiving portions 212,225 of the female robust connector mate with the blade connectors 206,228 of the male robust connector in an aligned and firm manner such that the common problems associated with the breakage of the blade connectors is avoided.

Also, the housing 270 of the male robust SATA compatible connector 24 may further include a legacy Integrated Drive Electronics (IDE) power section receptacle 266, and a user section receptacle 268. The legacy IDE power section receptacle 266 includes various legacy pins 267, such as 12 V and 5 V power pins and associated ground pins that are connected to the PCB 13, and that can be used for powering a storage peripheral, such as a disk drive, instead of utilizing the SATA power blade connector.

Further, the housing 270 of the male robust SATA compatible connector 24 may further include a user section receptacle 268 that includes a plurality of square pins 269 that are utilized to command a storage peripheral, such as a disk drive, to operate in a plurality of different modes. In the disk drive embodiment, the user section receptacle 268 is often used in disk drive testing. The square pins 269 of the user section receptacle 228 are connected to the PCB 13.

Embodiments of the present invention for the female robust SATA connector 22 and the male robust SATA connector 24 also provide for pre-grounding (i.e. the dissipation of electro-static discharge (ESD)). As previously discussed, one or both of the guide arms 220 of the female robust SATA compatible connector 22 may include a conductive contact 237 such as a grounding clip. The grounding contacts 237 of the guide arms may be coupled to ground conductors of the shielded SATA compatible cable 70 inside of the data and power blade-receiving portions 212,225, respectively, in order to effectuate various grounding configurations for pre-grounding. Further, one or both of guide arm receiving cavities 254 may include a conductive surface such as a grounding tab (e.g. a metal grounding tab). Each grounding tab is coupled to ground on the PCB 13 by a ground post 263, respectively. Also, the rectangular guide arm receiving cavities include conductive surfaces for mating with a corresponding grounding contact of the corresponding rectangular guide arm.

Accordingly, as an example, when the female robust SATA connector 22 is mated to the male robust SATA connector 24, the conductive contacts 237 of the guide arms 220 will engage the grounding tabs of the guide arm receiving cavities 254 providing pre-grounding to either one or both of the data and/or power blade-receiving portions 212,225 before they engage with the corresponding data and/or power blade connectors 206,228.

Also, the housing 210 and the guide arms 220 may be made from a conductive material (e.g. a metallic material or a conductive plastic material) such that the female robust SATA connector 22 is conductive in conjunction with the conductive shielded SATA compatible cable 70. Further, the housing 270 of the male robust SATA connector 24 may also be made from a conductive material (e.g. a metallic material or a conductive plastic material) such that the male robust SATA connector 24 is also conductive and can be grounded. In this way, when the female robust SATA connector 22 is mated to the conductive male robust SATA connector 24, the guide arms 220 will first engage the guide arm receiving cavities 254 providing grounding between the conductive housing 210 of the female robust SATA connector 22, the conductive shielded SATA compatible cable 70, and the conductive housing 270 of the male robust SATA connector 24.

Figure 4:
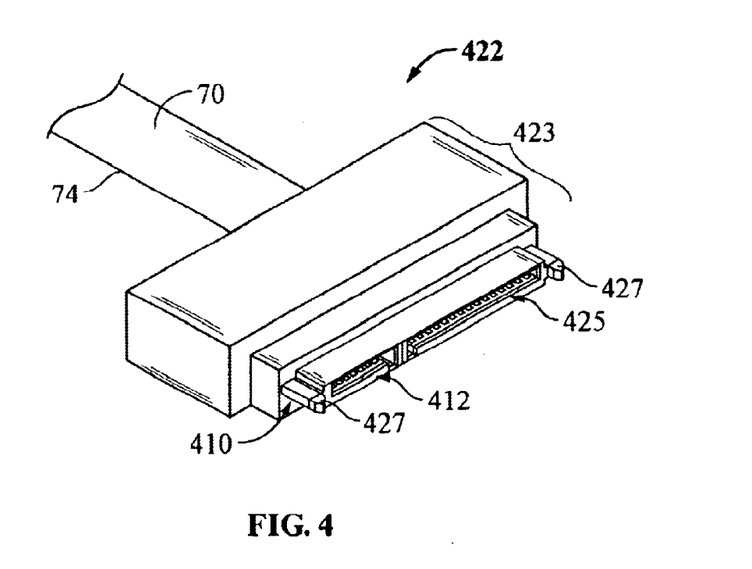
FIG. 4 shows a perspective view of another example of a female SATA cable connector, according to one embodiment of the invention.

With reference now to FIG. 4, another example of a female SATA cable connector 422 for use as the SATA cable connector 22 and/or 76, respectively, of the shielded SATA compatible cable 70 is shown. Particularly, the female SATA cable connector 422 includes a conductive two-tiered shaped housing 423 (e.g. made from a conductive metallic material or a conductive plastic material), and a SATA standards-defined non-conductive female mating portion 410 having a data blade-receiving portion 412, a power blade-receiving portion 425, and opposed guide rails 427 to mate with the SATA standards-defined guide slots of the SATA standards-defined male SATA connector.

Figure 5A:
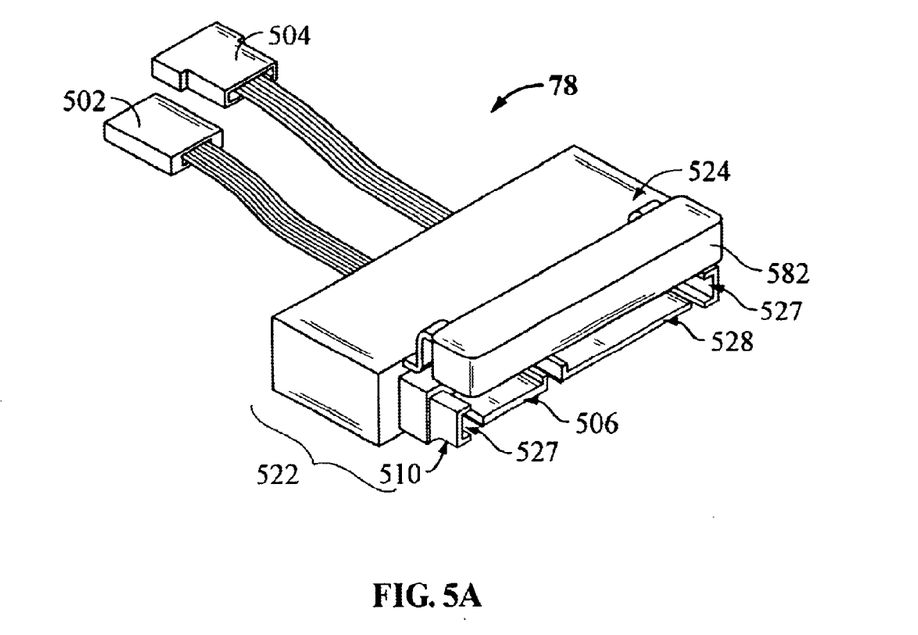
FIG. 5A shows a perspective view of another example of a male SATA host connector, according to one embodiment of the invention.
Figure 5B:
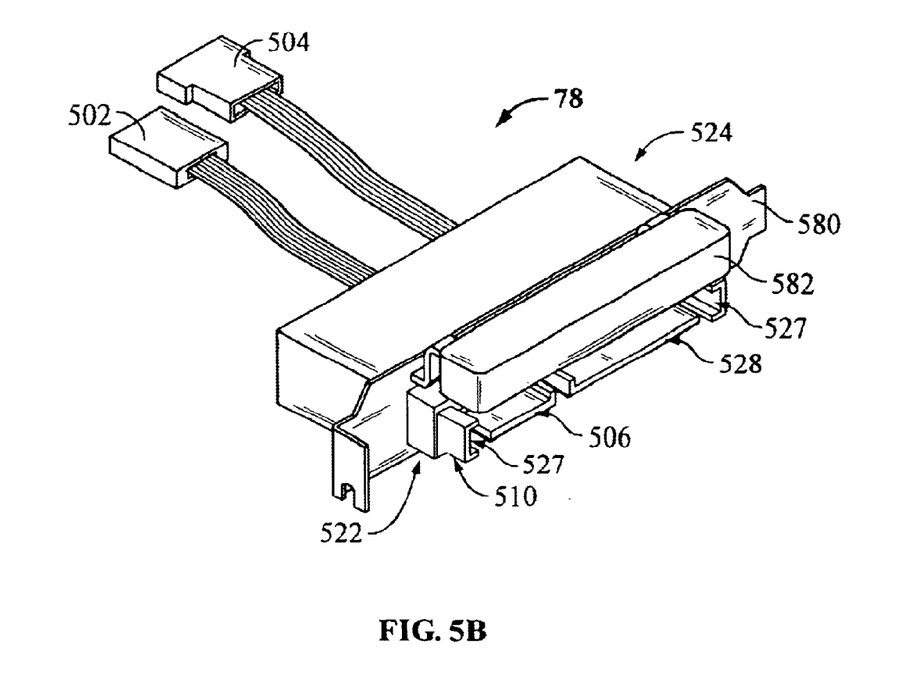
FIG. 5B shows a perspective view of another example of a male SATA host connector having an attachment shroud and a moveable cover, according to one embodiment of the invention.

With reference now to FIGS. 5A and 5B, another example of a male SATA connector 524 for use as the SATA device connector 24 of the external SATA compatible disk drive 10 and/or the male SATA host connector 78 of the host computer 12 is shown. As previously discussed, male SATA connector can be either attached to PCBs (e.g. FIG. 3B) or as shown here to other standard SATA data connectors 502 and standard SATA power connectors 504. Particularly, the male SATA cable connector 524 includes a conductive two-tiered shaped housing 522 (e.g. made from a conductive metallic material or a conductive plastic material), and a SATA standards-defined non-conductive male mating portion 510 having a data blade connector 506, a power blade connector 528, and guide slots 527.

Figure 6A:
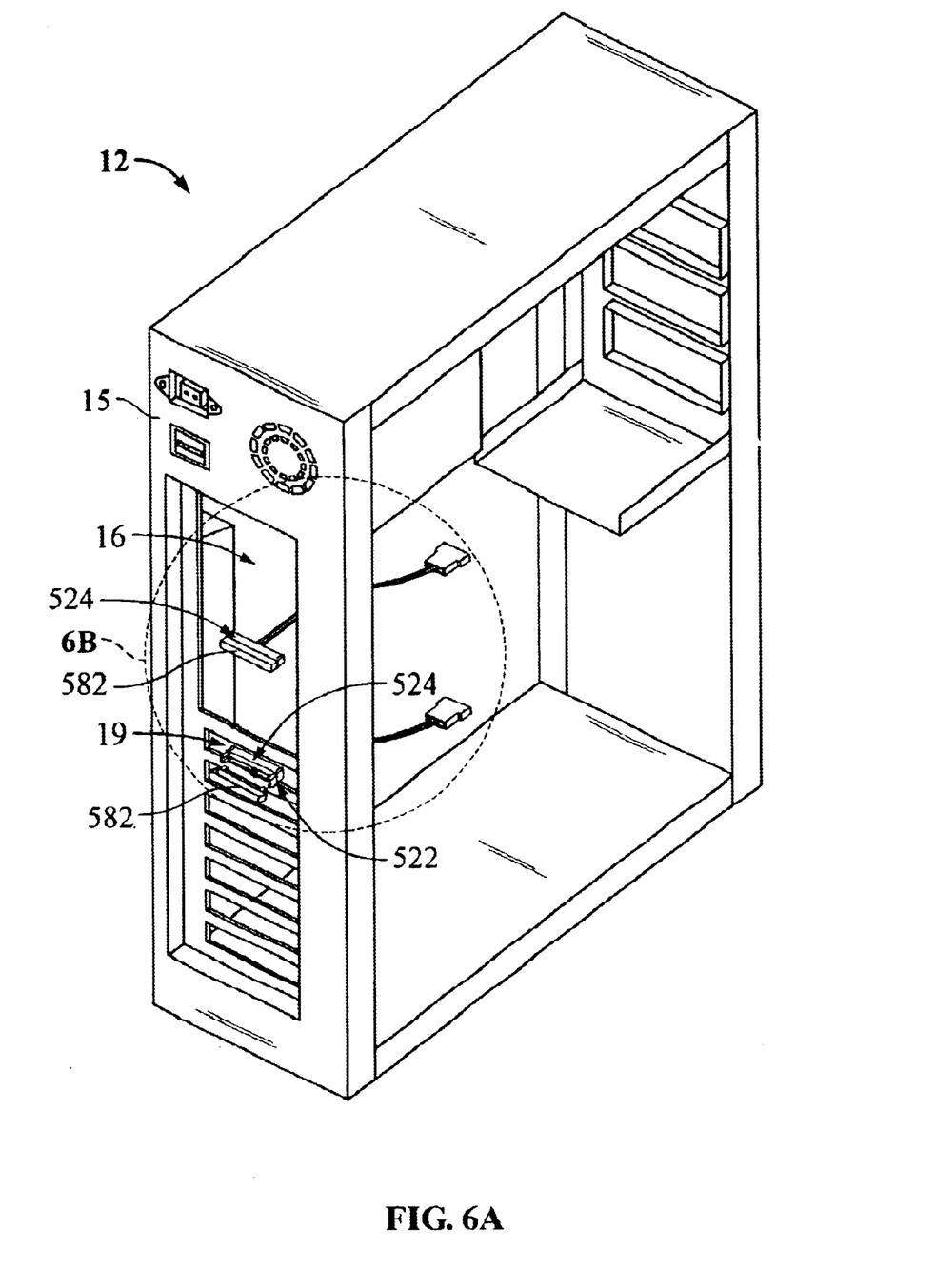
FIG. 6A shows a perspective view of a host computer to which a male SATA host connector may be mounted.
Figure 6B:
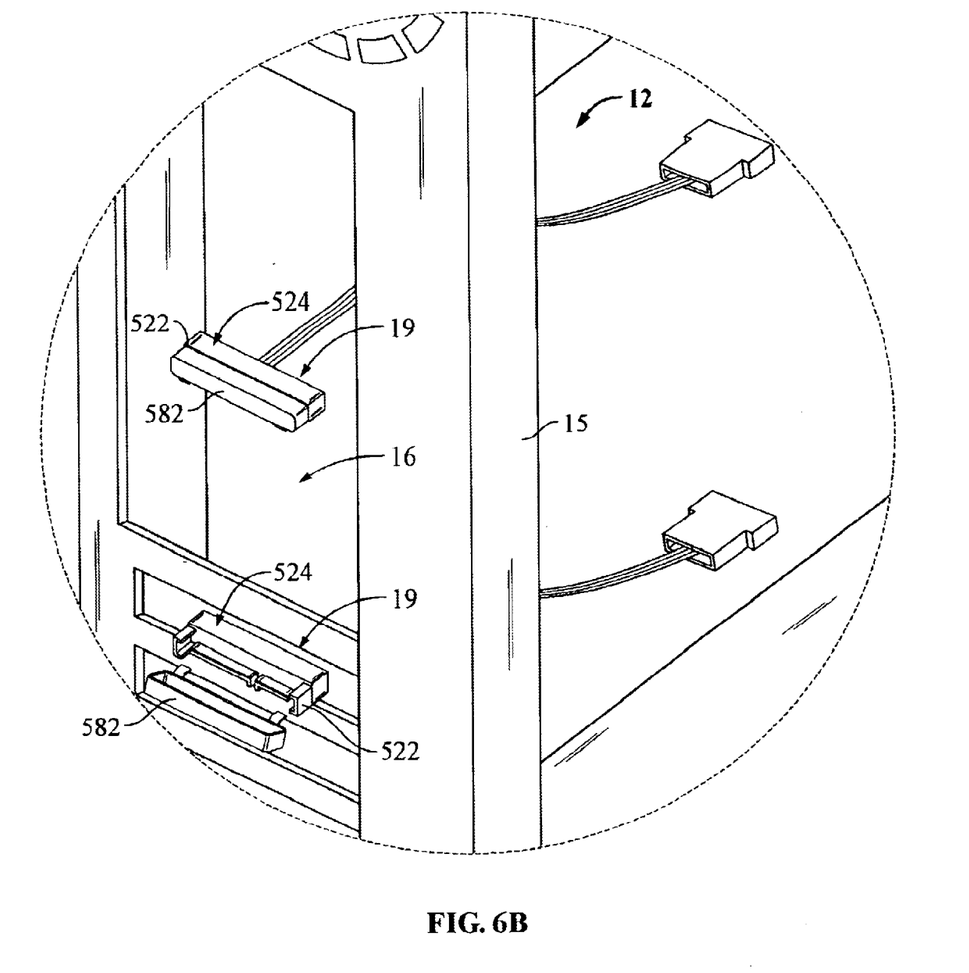
FIG. 6B is a more detailed perspective view of FIG. 6A.

Also, as particularly shown in FIG. 5B, and with reference to FIGS. 6A and 6B, a conductive attachment shroud 580 is shown coupled to the conductive two-tiered housing 522 of the male SATA host connector 524. The conductive attachment shroud 580 is attachable to a slot 19 of the conductive back-panel 16 of the conductive enclosure 15 of the host computer 12 such that when the female SATA cable connector 422 of the shielded SATA compatible cable 70 at the host end mates with the male SATA host connector 524 of the host computer 12, the conductive two-tiered shaped housing 423 of the female SATA cable connector 422 contacts and electrically couples to the conductive two-tiered housing 522 of the male SATA host connector 524.

Thus, the conductive shield 74 surrounding the SATA compatible cable 70 is electrically coupled through the conductive two-tiered shaped housing 423 of the female SATA cable connector 422 to the conductive two-tiered housing 522 of the male SATA host connector 524 and through the attachment shroud 580 to the conductive back-panel 16 of the conductive enclosure 15 of the host computer 12. In this way, the shielded SATA compatible cable 70 is electrically coupled to both the conductive enclosure 72 of the external SATA compatible disk drive 10 and the conductive enclosure 15 of the host computer 12 such that sufficient electromagnetic shielding is provided and very low EMI is assured.

Also, the host computer 12 may include a moveable cover 582 to cover the male SATA host connector 524. Although, the power signals from the host computer 12 are inherently current limited (e.g. to 7 Amps maximum) by the power supply of the host computer 12 to meet regulatory and safety concerns, a moveable cover 582 may be provided to prevent inadvertent shocks and to keep the male SATA host connector 524 clean. As shown in FIGS. 5 and 6, a simple elongated cover 582 may be hingedly attached to the male SATA host connector 524 for easy access to the SATA data and power blade connectors 506 and 528. Alternatively, the cover 582 may be completely removable.

Figure 7A:
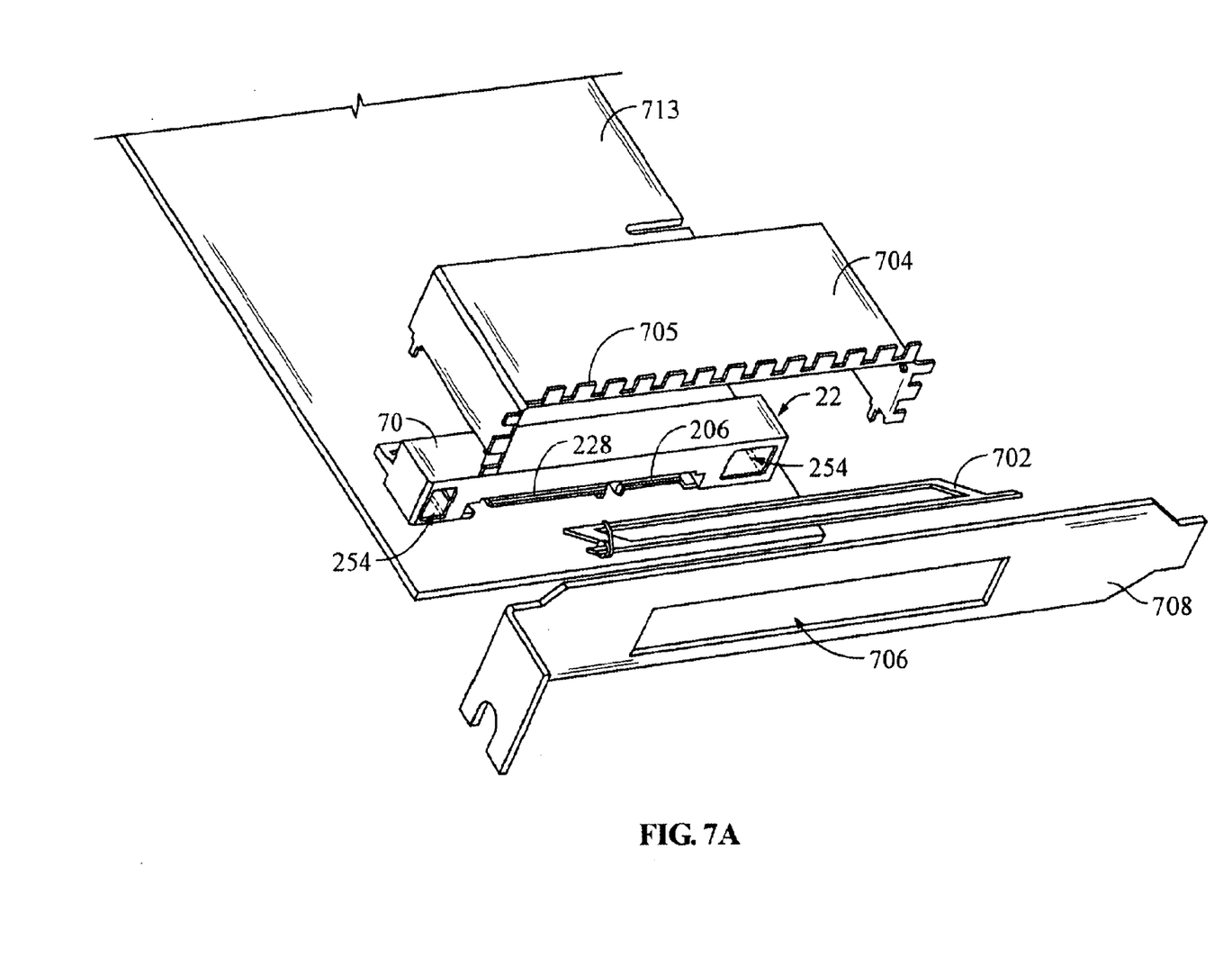
FIG. 7A shows a perspective view of a male robust SATA host connector attached to a PCB of a host computer and moveable cover, according to one embodiment of the invention.
Figure 7B:
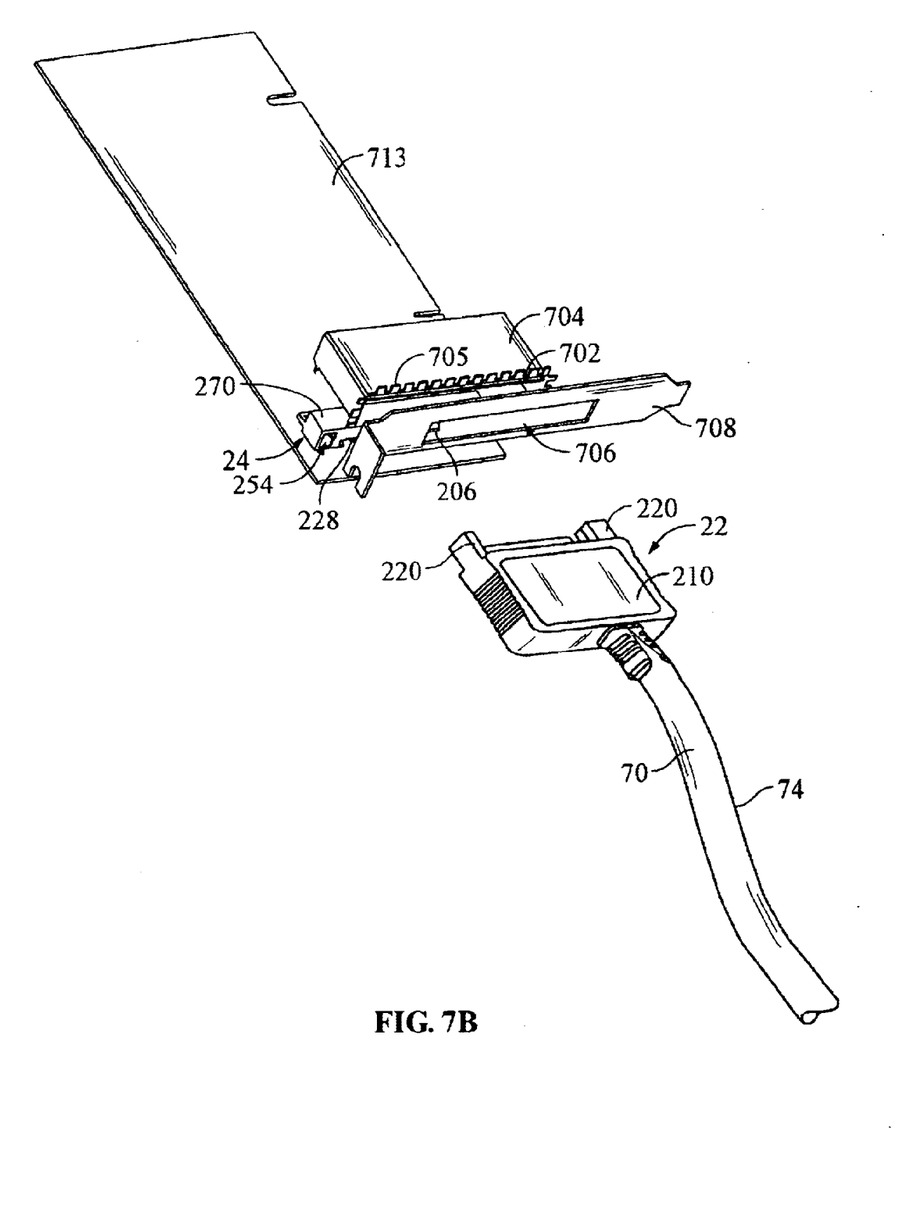
FIG. 7B shows a perspective view of the male robust SATA host connector attached to the PCB of the host computer with the moveable cover as shown in FIG. 7A, in conjunction with a female robust SATA cable connector for mating to the male robust SATA host connector, according to one embodiment of the invention.

Also, with reference to FIGS. 7A and 7B, in another embodiment, the host computer 12 may include another type of moveable cover 702 to cover a male robust SATA host connector 24 attached to a PCB 713 of the host computer 12. Although, the power signals from the host computer 12 are inherently current limited (e.g. to 7 Amps maximum) by the power supply of the host computer 12 to meet regulatory and safety concerns, a moveable cover 702 may be provided to prevent inadvertent shocks and to keep the male robust SATA host connector 24 clean.

As shown in FIGS. 7A and 7B, the moveable cover 702 may be hingedly attached to a conductive metallic box 704. The conductive metallic box 704 is mounted to the PCB 713 of the host computer 12 and to a conductive attachment shroud 708 of the host computer 12 by mounting tabs 715 proximate to a slot 706 of the conductive attachment shroud 708. The attachment shroud 708 is in turn mounted to a slot 19 of the back-panel 16 of the conductive enclosure 15 of the host computer 12 (as shown in FIGS. 6A and 6B). Thus, as shown in 7A and 7B, the hinged cover 702 isolates the SATA data and power blade connectors 206 and 228 of the male robust SATA host connector 24 while still allowing for easy by a female robust SATA connector 22.

With particular reference to FIG. 7B, when the female robust SATA connector 22 having a conductive housing 210, conductive guide arms 220 and conductively coupled with the conductive shielded SATA compliant cable 70, is engaged to with male robust SATA connector 24 having a conductive housing 270, the female robust SATA connector 22 pivots the hinged cover 702 upwards and enters through slot 706 into the host computer 12. Further, the guide arms 220 then engage the guide arm receiving cavities 254 of the male robust SATA host connector 24 providing grounding between the conductive housing 210 of the female robust SATA connector 22, the conductive shielded SATA compliant cable 70, and the conductive housing 270 of the male robust SATA host connector 24 to the PCB 13 and/or to the metallic box 704. For example, ground lines of the PCB 713 may couple the male robust SATA host connector 24 to the metallic box 704, which in turn contacts and is electrically coupled to the conductive attachment shroud 708. Further, in addition to, or instead of, the conductive housing 210 of the of the female robust SATA connector 22 may contact and be electrically coupled to the metallic box 704, which in turn contacts and is electrically coupled to the conductive attachment shroud 708.

Moreover, the conductive attachment shroud 708 is in turn to slot 19 of the conductive back-panel 16 of the conductive enclosure 15 of the host computer 12 (e.g. see FIGS. 6A and 6B). Thus, when the female robust SATA connector 22 having the conductive shielded SATA compatible cable 70 attached thereto is electrically coupled to the metallic box 704, the conductive shield 74 surrounding the SATA compatible cable 70 is electrically coupled through the conductive housing 210 of the female robust SATA cable connector 22 to the metallic box 704 and through the attachment shroud 708 to the conductive back-panel 16 of the conductive enclosure 15 of the host computer 12. In this way, the shielded SATA compatible cable 70 is electrically coupled to both the conductive enclosure 72 of the external SATA compatible disk drive 10 and the conductive enclosure 15 of the host computer 12 such that sufficient electromagnetic shielding is provided and very low EMI is assured.

It should further be appreciated by those skilled in the art that although embodiments of the invention for an external SATA compatible disk drive have been illustrated for use with a host computer, that numerous alternative types of external disk drives utilizing differing types of standards for various types of electronic devices are deemed to lie within the spirit and scope of the invention.

Other modifications and embodiments will occur to those of skill in this art and all such modifications and other embodiments are deemed to fall within the scope of the present invention.

We claim:

1. An external disk drive compatible with a Serial Advanced Technology Attachment (SATA) standard for attachment to a host having a conductive enclosure including a conductive back-panel, the external SATA compatible disk drive comprising:
   a disk for rotation within the disk drive;
   a moveable head for writing and reading data to and from the disk;
   a disk controller system for controlling operations in the disk drive;
   a Printed Circuit Board (PCB) for mounting the disk controller system;
   a SATA device connector coupled to the PCB;
   an enclosure surrounding the external SATA compatible disk drive;
   a SATA compatible cable having a disk drive end coupled to the SATA device connector of the disk drive and a host end for coupling to the host, the SATA compatible cable to deliver power signals to the external SATA compatible disk drive from the host; and
   a shield surrounding the SATA compatible cable, the shield being coupled to the enclosure of the disk drive.

2. The external SATA compatible disk drive of claim 1, wherein the enclosure surrounding the external SATA compatible disk drive is made from a conductive material.

3. The external SATA compatible disk drive of claim 2, wherein the shield surrounding the SATA compatible cable is made from a conductive material.

4. The external SATA compatible disk drive of claim 3, wherein the conductive shield surrounding the SATA compatible cable at the disk drive end of the SATA compatible cable contacts and is electrically coupled to the conductive enclosure of the disk drive thereby forming a continuous electro-magnetic interference (EMI) shield about the external SATA compatible disk drive and the cable.

5. The external SATA compatible disk drive of claim 3, wherein the disk drive end of the SATA compatible cable includes a SATA cable connector to mate with the SATA device connector of the disk drive.

6. The external SATA compatible disk drive of claim 5, wherein the host end of the SATA compatible cable includes a SATA cable connector.

7. The external SATA compatible disk drive of claim 6, wherein the host includes a SATA host connector attachable to a slot of the conductive back-panel of the host, the SATA cable connector of the SATA compatible cable at the host end to mate with the SATA host connector of the host such that SATA data signals and power signals are deliverable from the host to the external SATA compatible disk drive through the SATA compatible cable.

8. The external SATA compatible disk drive of claim 6, wherein the SATA compatible cable is compatible for use with a UL 1950/EN60950 standard.

9. The external SATA compatible disk drive of claim 7, wherein the power signals from the host are current limited.

10. The external SATA compatible disk drive of claim 7, wherein, when the SATA cable connector of the SATA compatible cable at the host end mates with the SATA host connector of the host, the conductive shield surrounding the SATA compatible cable is electrically coupled to the conductive back-panel of the conductive enclosure of the host, in this way the SATA compatible cable is electrically coupled to both the conductive enclosure of the disk drive and the conductive enclosure of the host such that electromagnetic shielding is provided.

11. The external SATA compatible disk drive of claim 7, wherein the SATA host connector is attachable to the slot of the conductive back-panel of the conductive enclosure of the host by a conductive attachment shroud such that when the SATA cable connector of the SATA compatible cable at the host end mates with the SATA host connector of the host, the conductive shield surrounding the SATA compatible cable is electrically coupled to the conductive attachment shroud, in this way the SATA compatible cable is electrically coupled to both the conductive enclosure of the disk drive and the conductive enclosure of the host such that electromagnetic shielding is provided.

12. The external SATA compatible disk drive of claim 7, wherein the host includes a moveable cover to cover the SATA host connector of the host.

13. The external SATA compatible disk drive of claim 8, wherein the SATA cable connector at the host end and the SATA cable connector at the disk drive end of the SATA compatible cable are both compatible for use with a UL 1950/EN60950 standard.

14. An external disk drive compatible with a Serial Advanced Technology Attachment (SATA) standard for attachment to a host having a conductive enclosure including a conductive back-panel, the external SATA compatible disk drive comprising:
   a disk for rotation within the disk drive;
   a moveable head for writing and reading data to and from the disk;
   a disk controller system for controlling operations in the disk drive;
   a Printed Circuit Board (PCB) for mounting the disk controller system;
   a SATA device connector coupled to the PCB;
   a conductive enclosure surrounding the external SATA compatible disk drive;

a SATA compatible cable having a disk drive end coupled to the SATA device connector of the disk drive and a host end for coupling to the host, the SATA compatible cable to deliver power signals to the external SATA compatible disk drive from the host; and a conductive shield surrounding the SATA compatible cable, wherein the conductive shield surrounding the SATA compatible cable at the disk drive end of the SATA compatible cable contacts and is electrically coupled to the conductive enclosure of the disk drive thereby forming a continuous electro-magnetic interference (EMI) shield about the external SATA compatible disk drive and the cable.

15. The external SATA compatible disk drive of claim 14, wherein the disk drive end of the SATA compatible cable includes a SATA cable connector to mate with the SATA device connector of the disk drive.

16. The external SATA compatible disk drive of claim 15, wherein the host end of the SATA compatible cable includes a SATA cable connector.

17. The external SATA compatible disk drive of claim 16, wherein the host includes a SATA host connector attachable to a slot of the conductive back-panel of the host, the SATA cable connector of the SATA compatible cable at the host end to mate with the SATA host connector of the host such that SATA data signals and power signals are deliverable from the host to the external SATA compatible disk drive through the SATA compatible cable.

18. The external SATA compatible disk drive of claim 16, wherein the SATA compatible cable is compatible for use with a UL 1950/EN60950 standard.

19. The external SATA compatible disk drive of claim 17, wherein the power signals from the host are current limited.

20. The external SATA compatible disk drive of claim 17, wherein, when the SATA cable connector of the SATA compatible cable at the host end mates with the SATA host connector of the host, the conductive shield surrounding the SATA compatible cable is electrically coupled to the conductive back-panel of the conductive enclosure of the host, in this way the SATA compatible cable is electrically coupled to both the conductive enclosure of the disk drive and the conductive enclosure of the host such that electromagnetic shielding is provided.

21. The external SATA compatible disk drive of claim 17, wherein the SATA host connector is attachable to the slot of the conductive back-panel of the conductive enclosure of the host by a conductive attachment shroud such that when the SATA cable connector of the SATA compatible cable at the host end mates with the SATA host connector of the host, the conductive shield surrounding the SATA compatible cable is electrically coupled to the conductive attachment shroud, in this way the SATA compatible cable is electrically coupled to both the conductive enclosure of the disk drive and the conductive enclosure of the host such that electromagnetic shielding is provided.

22. The external SATA compatible disk drive of claim 17, wherein the host includes a moveable cover to cover the SATA host connector of the host.

23. The external SATA compatible disk drive of claim 18, wherein the SATA cable connector at the host end and the SATA cable connector at the disk drive end of the SATA compatible cable are both compatible for use with a UL 1950/EN60950 standard.

24. A system for connecting an external disk drive compatible with a Serial Advanced Technology Attachment (SATA) standard to a host, the host having a conductive enclosure including conductive back-panel, the system comprising:

an external SATA compatible disk drive having a SATA device connector;

an enclosure surrounding the external SATA compatible disk drive;

a SATA compatible cable having a disk drive end including a SATA cable connector coupled to the SATA device connector of the disk drive and a host end having a SATA cable connector for coupling to the host;

a shield surrounding the SATA compatible cable, the shield being coupled to the enclosure of the external SATA compatible disk drive; and a SATA host connector attachable to a slot of the conductive back-panel of the host, the SATA cable connector of the SATA compatible cable at the host end to mate with the SATA host connector of the host such that SATA data signals and power signals are deliverable from the host to the external SATA compatible disk drive through the SATA compatible cable.

25. The system of claim 24, wherein the power signals from the host are current limited.

26. The system of claim 24, wherein the enclosure surrounding the external SATA compatible disk drive is made from a conductive material.

27. The external SATA compatible disk drive of claim 24, wherein the SATA compatible cable is compatible for use with a UL 1950/EN60950 standard.

28. The external SATA compatible disk drive of claim 24, wherein the SATA cable connector at the host end and the SATA cable connector at the disk drive end of the SATA compatible cable are both compatible for use with a UL 1950/EN60950 standard.

29. The system of claim 26, wherein the shield surrounding the SATA compatible cable is made from a conductive material.

30. The system of claim 29, wherein the conductive shield surrounding the SATA compatible cable at the disk drive end of the SATA compatible cable contacts and is electrically coupled to the conductive enclosure of the disk drive thereby forming a continuous electro-magnetic interference (EMI) shield about the external SATA compatible disk drive and the cable.

31. The system of claim 30, wherein, when the SATA cable connector of the SATA compatible cable at the host end mates with the SATA host connector of the host, the conductive shield surrounding the SATA compatible cable is electrically coupled to the conductive back-panel of the conductive enclosure of the host, in this way the SATA compatible cable is electrically coupled to both the conductive enclosure of the disk drive and the conductive enclosure of the host such that electromagnetic shielding is provided.

32. The system of claim 30, wherein the SATA host connector is attachable to the slot of the conductive back-panel of the conductive enclosure of the host by a conductive attachment shroud such that when the SATA cable connector of the SATA compatible cable at the host end mates with the SATA host connector of the host, the conductive shield surrounding the SATA compatible cable is electrically coupled to the conductive attachment shroud, in this way the SATA compatible cable is electrically coupled to both the conductive enclosure of the disk drive and the conductive enclosure of the host such that electromagnetic shielding is provided.

33. The system of claim 30, wherein the host includes a moveable cover to cover the SATA host connector of the host.

* * * * *